(12) United States Patent
Chueh et al.

(10) Patent No.: US 10,077,390 B2
(45) Date of Patent: Sep. 18, 2018

(54) WORKING FLUID AND MANUFACTURING METHOD OF METAL PARTICLES

(71) Applicant: National Tsing Hua University, Hsinchu (TW)

(72) Inventors: Yu-Lun Chueh, Hsinchu (TW); Ming-Chang Lu, Hsinchu (TW); Chih-Chung Lai, Hsinchu (TW); Shih-Ming Lin, Hsinchu (TW); Yuan-Da Chu, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 14/803,826

(22) Filed: Jul. 20, 2015

(65) Prior Publication Data

US 2015/0322323 A1 Nov. 12, 2015

Related U.S. Application Data

(63) Continuation-in-part of application No. 14/093,315, filed on Nov. 29, 2013, now abandoned.

(30) Foreign Application Priority Data

May 30, 2013 (TW) .............................. 102119196 A

(51) Int. Cl.
C09K 3/18 (2006.01)
C09K 5/10 (2006.01)
(Continued)

(52) U.S. Cl.
CPC ................. C09K 5/10 (2013.01); B05D 1/36 (2013.01); B05D 3/0254 (2013.01); B05D 5/00 (2013.01); B05D 7/14 (2013.01); C09K 5/12 (2013.01)

(58) Field of Classification Search
CPC ... C09K 5/00; C09K 5/02; C09K 5/06; C09K 5/14; C09K 5/20
(Continued)

(56) References Cited

U.S. PATENT DOCUMENTS 4,954,235 A * 9/1990 Takeshima ............... C25D 7/00
  204/273
7,820,291 B2 * 10/2010 Kim ......................... B01J 13/02
  428/403

(Continued)

FOREIGN PATENT DOCUMENTS

CN  1280398 A    1/2001
TW  200519042   6/2005
TW  200633206   9/2006

OTHER PUBLICATIONS

Hong et al., "Enhancing Heat Capacity of Colloidal Suspension Using Nanoscale Encapsulated Phase-Change Materials for Heat Transfer", Applied Materials & Interfaces, vol. 2, No. 6, pp. 1685-1691, 2010. Published Jun. 7, 2010.

(Continued)

*Primary Examiner* — Jane L Stanley
(74) *Attorney, Agent, or Firm* — Muncy, Geissler, Olds & Lowe, P.C.

(57) ABSTRACT

A working fluid in cooperation with a solar thermal system comprises a heat conduction medium and a plurality of metal particles mixed in the heat conduction medium. Each of the metal particles includes a metal particle and a protection layer, and the protection layer is an oxide and covers the metal particle. A manufacturing method of metal particles is also disclosed.

9 Claims, 16 Drawing Sheets

(51) Int. Cl.
*B05D 3/02* (2006.01)
*B05D 1/36* (2006.01)
*B05D 7/14* (2006.01)
*B05D 5/00* (2006.01)
*C09K 5/12* (2006.01)

(58) Field of Classification Search
USPC .................................................. 252/70, 71
See application file for complete search history.

(56) References Cited

U.S. PATENT DOCUMENTS

| | | | | |
|---|---|---|---|---|
| 2002/0187347 | A1* | 12/2002 | Halas | A61K 41/0042 428/403 |
| 2006/0177660 | A1* | 8/2006 | Kumar | B01J 13/02 428/403 |
| 2006/0196310 | A1* | 9/2006 | Toshima | B01J 13/0043 75/392 |
| 2007/0158611 | A1 | 7/2007 | Oldenburg | |
| 2010/0055170 | A1* | 3/2010 | Lee | A61K 47/48861 424/451 |
| 2011/0121246 | A1 | 5/2011 | Biggin et al. | |
| 2013/0264198 | A1* | 10/2013 | Wang | B01J 23/462 204/290.14 |
| 2014/0084205 | A1 | 3/2014 | Singh et al. | |

OTHER PUBLICATIONS

Wei, "Surface Modification of Silver Nanoparticles in Phase Change Materials for Building Energy Application", Advanced Materials Research, cols. 622-623, 2013, pp. 889-892, published online Dec. 27, 2012.

Starace et al., "Nanofluid Heat Capacities", Journal of Applied Physics, 110, 124323, 2011, published online Dec. 29, 2011.

Hong et al., "Controlling Super-Cooling of Encapsulated Phase Change Nanoparticles for Enhanced Heat Transfer", Chemical Physics Letters, 504, 2011, pp. 180-184, published online Jan. 26, 2011.

Bo-Bin Xiao et al., Enhancement of Heat Transfer Using Nanofluids of High Temperature Molten Salt, Institute of Nuclear Engineering and Science, National Tsing-Hua University, 2011, pp. 1-2.

Ming-Chang Lu et al., Enhancing Energy Storage of the Solar-Thermal System Using Nanocrystals, National Science Council, 2012, p. 1.

* cited by examiner

WORKING FLUID AND MANUFACTURING METHOD OF METAL PARTICLES

CROSS REFERENCE TO RELATED APPLICATIONS

This application is a Continuation-In-Part of U.S. application Ser. No. 14/093,315 filed on Nov. 29, 2013, which claims priority under 35 U.S.C. § 119(a) on Patent Application No(s). 102119196 filed in Taiwan, Republic of China on May 30, 2013, the entire contents of which are hereby incorporated by reference.

BACKGROUND OF THE INVENTION

Field of Invention

The invention relates to a working fluid and a manufacturing method of particles and, in particular, to a working fluid and a manufacturing method of particles that can be applied to enhance energy storage for a solar thermal system or any other thermal systems.

Related Art

Highly restricted by the sunrise and sunset, solar energy is just produced in the daytime. A solar thermal energy system can store the thermal energy from sunlight to provide the energy for both daytime and the nighttime usage, and thus becomes a promising field of the new energy resource. The operating principle of the solar thermal system is illustrated as below. A working fluid stored within a container is heated by the sunlight reflected by a solar tracking apparatus. The heating working fluid then flows to a heat exchanger that transporting its heat to produce water streams to propel a turbo-generator for generating required electric power. Meanwhile, the cooled working fluid after the heat exchange will flow back to the container, finishing a complete cycle.

The heat storing capability of the solar thermal system mainly depends on the heat capacity of the working fluid. However, the effective heat capacity of the current solar thermal system is relatively less (less than the liquid water), led to a less heat storing capability of the solar thermal system, thus limiting the application and development of the solar thermal systems.

SUMMARY OF THE INVENTION

An objective of the invention is to provide a working fluid with higher heat capacity to enhance the heat storage of the solar thermal system or other thermal systems. Furthermore, we demonstrated that the heat capacity enhancement could also be achieved at a wide temperature range. This is a result of the release of latent heat of alloy particles. Besides, the latent heat enhanced energy absorption could be designed at a particular temperature range because it was dependent on the composition of the alloy particles.

Besides, another objective of the invention is to provide a manufacturing method of metal particles that has several advantages such as simplified processes, lower cost and multiple applications, and the nano-particles can be added into the working fluid to effectively enhance the heat capacity thereof.

To achieve the above objective, a working fluid according to the invention comprises a heat conduction medium and a plurality of metal particles mixed in the heat conduction medium. Each of the metal particles includes an alloy particle and a protection layer covering the alloy particle. The alloy particle includes a first metal and a second metal, the effective heat capacity of the working fluid is dependent on an expected ratio of the first metal to the second metal. The working fluid's effective heat capacity is enhanced because of the release of the latent of the alloy particles in the working fluid.

To achieve the above objective, a manufacturing method of metal particles according to the invention comprises steps of: adding a first metal and a second metal into an alcoholic solvent to deposit the second metal on the first metal to form an alloy basis particle, wherein the alloy basis particle has an expected ratio of the first metal to the second metal; adding the alloy basis particle into an alcoholic solvent to form a first solution; heating the first solution and adding a precursor to the first solution to form a second solution; adjusting the pH value of the second solution to between 4 and 5; and implementing an annealing procedure to form a protection layer on the surface of the alloy basis particle, wherein the protection layer covers the alloy basis particle to form a metal particle.

In one embodiment, the temperature range of the latent heat absorption/releasing is dependent on the expected ratio of the first metal to the second metal.

In one embodiment, the weight percent of the metal particles added to the heat conduction medium ranges between 1% and 20%.

In one embodiment, the expected ratio of the first metal to the second metal is controllable.

In one embodiment, the melting point of the protection layer is higher than the melting points of the first metal and the second metal.

In one embodiment, the material of the protection layer comprises oxide.

In one embodiment, the oxide comprises metal oxide or silicon oxide.

In one embodiment, the first metal is zinc (Zn) and the second metal is tin (Sn).

In one embodiment, the precursor includes 3-Aminopropyl trimethoxysilane (APTMS), γ-Glycidoxypropyltrimethoxysilane (GPTMS), or tetraethyl orthosilicate (TEOS).

In one embodiment, the annealing temperature of the annealing procedure ranges between 200° C. and 300° C., and the annealing duration ranges between one hour and two hours.

In one embodiment, the manufacturing method further comprises a step of mixing a plurality of the metal particles in a heat conduction medium to form a working fluid, wherein the temperature range of latent heat releasing/absorption of alloy particles in the working fluid is dependent on the expected ratio of the first metal to the second metal.

In one embodiment, the manufacturing method further comprises a step of determining an adjustable controllable ratio as the expected ratio before adding the first metal and the second metal into the alcoholic solvent to deposit the second metal on the first metal to form the alloy basis particle.

In summary, the manufacturing method of the metal particles includes the steps of: depositing a second metal on a first metal to form an alloy basis particle by electroless plating; adding the alloy basis particle to an alcoholic solvent to form a first solution; heating the first solution and adding a precursor to the first solution to form a second solution; adjusting the pH value of the second solution to between 4 and 5; and implementing an annealing procedure to form a protection layer on the surface of the alloy basis particle, wherein the protection layer can be an oxide covering the alloy basis particle and the alloy basis particle becomes an alloy particle. Thereby, the manufacturing method of metal particles of the invention can have several advantages such as simplified processes, lower cost and multiple applications. Since the metal nano-particles of the invention are highly able to convey heat and store heat and will not be a flow resistance, they are suitable to be added to the heat conduction medium of a solar thermal system or any other thermal system for increasing the effective heat capacity of the working fluid. Moreover, the alloy particle includes the first metal and the second metal, the alloy particle has an expected ratio of the first metal to the second metal. The heat capacity enhancement of the working fluid is a result of the release of the latent heat of the alloy particles. Moreover, the heat capacity enhancement occurs over a wide temperature range because the process of melting of the alloy particles covers a certain temperature range. Furthermore, the temperature range at which the working fluid's heat capacity was enhanced is dependent on the ratio of the first metal to the second metal. Therefore, the invention further demonstrates the ability to control latent heat absorption/releasing at a certain temperature range. As a consequence, the adjustable endothermic plateaus could be applied to enhance energy storage for a variety of industrial systems.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
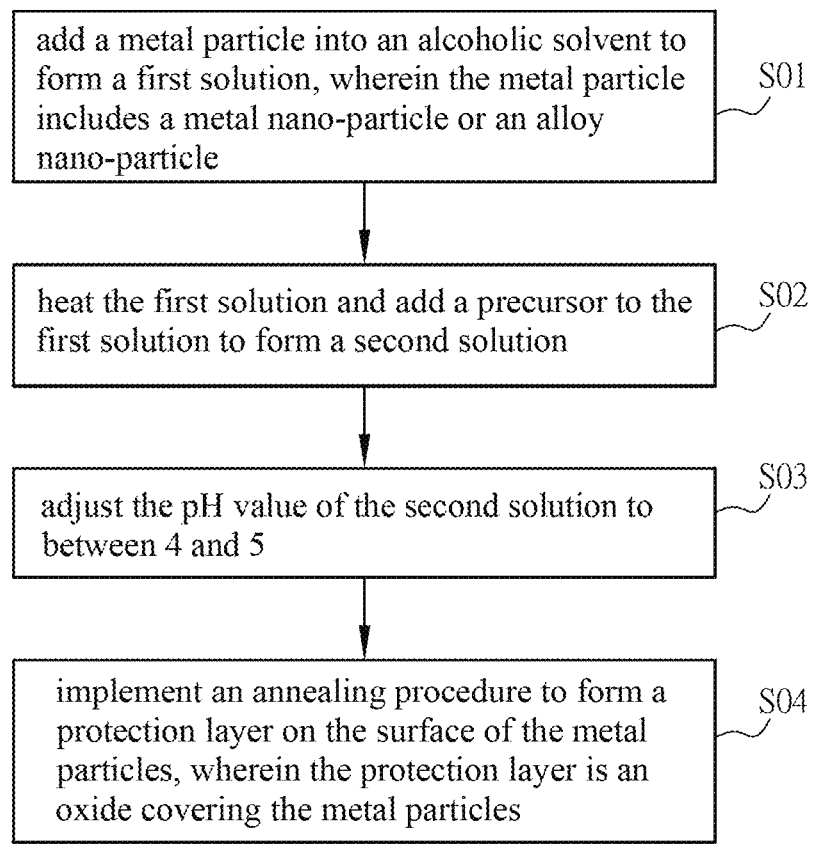
FIG. 1 is a flow chart of a manufacturing method of particles according to a first embodiment of the invention.

FIG. 1 is a flow chart of a manufacturing method of particles according to the first embodiment of the invention. The manufacturing method of particles includes the steps S01 to S04. In the embodiment, the metal particles refer to tiny metal particle, for example, nano particle or micro particle.

First, the step S01 is to add a metal particle into an alcoholic solvent to form a first solution, wherein the metal particle includes a particle of single metal, an alloy particle, a nano-particle of single metal or an alloy nano-particle. In the first embodiment, the metal particle is the nano-particle of single metal for example. In the second embodiment, the metal particle is the alloy particle and descripted later. The said metal can include tin or aluminum and the said alloy can include aluminum-germanium alloy or tin-zinc alloy, for example. The metal or alloy can be other kinds as long as they can absorb the heat at the working temperature (such as a temperature range marked on the molten salt products, and here of 142° C.~535° C. as an example) of a working fluid. In the first embodiment, the material of the metal particle is a single metal material for example. Herein, the metal particle is a tin nano-particle and the alcoholic solvent is ethanol, for example. Accordingly, the tin nano-particle is added into the ethanol to form the first solution of 0.05M. However, in other embodiments, other kinds of metal particle or alcoholic solvent can be joined, and thus the concentration of the first solution has a range of 0.01M~0.1M.

The step S02 is to heat the first solution and add a precursor to the first solution to form a second solution. Herein, the first solution is heated to about 80° C. The precursor can include 3-Aminopropyl trimethoxysilane (APTMS), γ-Glycidoxypropyltrimethoxysilane (GPTMS), or tetraethyl orthosilicate (TEOS) for example. In this embodiment, a small amount (e.g. between 50 µl and 500 µl) of APTMS, 99.999% purity, is added to the first solution to form the second solution. However, in other embodiments, other kinds of precursors can be used. In the invention, APTMS is given as an example, and it can be directly bonded to the tin nano-particles (amino group of APTMS can be directly bonded to the tin nano-particles) without bonding the functional group of modification to the surface of the tin nano-particles first. Therefore, the manufacturing process of the invention can be simplified with the lower cost.

The step S03 is to adjust the pH value of the second solution to between 4 and 5. Thereby, the precursor can be uniformly attached to the tin nano-particles. The adjustment of the pH value can be accompanied by a sufficient stirring, and thus the nano-particles can be uniformly distributed in the solution.

The step S04 is to implement an annealing procedure to form a protection layer on the surface of the metal particles, wherein the protection layer is an oxide that covers the surface of metal particles. Herein, the annealing temperature of the annealing procedure can range between 200° C. and 300° C., and the annealing duration can range between one hour and two hours. The alcoholic solvent is evaporated during the heating process, and then the extra precursors and water are removed during the annealing procedure. Afterward, the protection layer can be formed to enclose the metal particles, and the metal particles with the protection layer become the metal core-shell nano-particles. The protection layer can include, for example, metal oxide or $SiO_x$. In this embodiment, a $SiO_x$ protection layer can be formed on the surface of the tin nano-particle by the annealing procedure, and thereby the metal nano-particles of tin-$SiO_x$ core-shell can be produced.

The manufacturing method of the metal particles of the invention is similar to a sol-gel method, which involves a conversion process from a liquid phase (sol) to a solid phase (gel) and has advantages such as simple processes and lower cost. Besides, because the protection layer encloses the metal particles, the oxidation of the metal particles can be prevented in the high-temperature environment, and therefore the nano-particles can keep it as original form. In addition to the tin nano-particles, the manufacturing method of the invention can be also applied to other kinds of metal or alloy nano-particles, achieving multiple applications. Moreover, the produced metal particles or metal nano-particles can be added into a heat conduction medium to form a working fluid. Since the metal particles are highly able to convey heat and store heat and will not become a flow resistance, they are suitable to be added to the heat conduction medium of a solar thermal system. In addition, the metal particles also can be applied to heat storing materials or energy-saving materials for example building material of energy saving.

Figure 2:
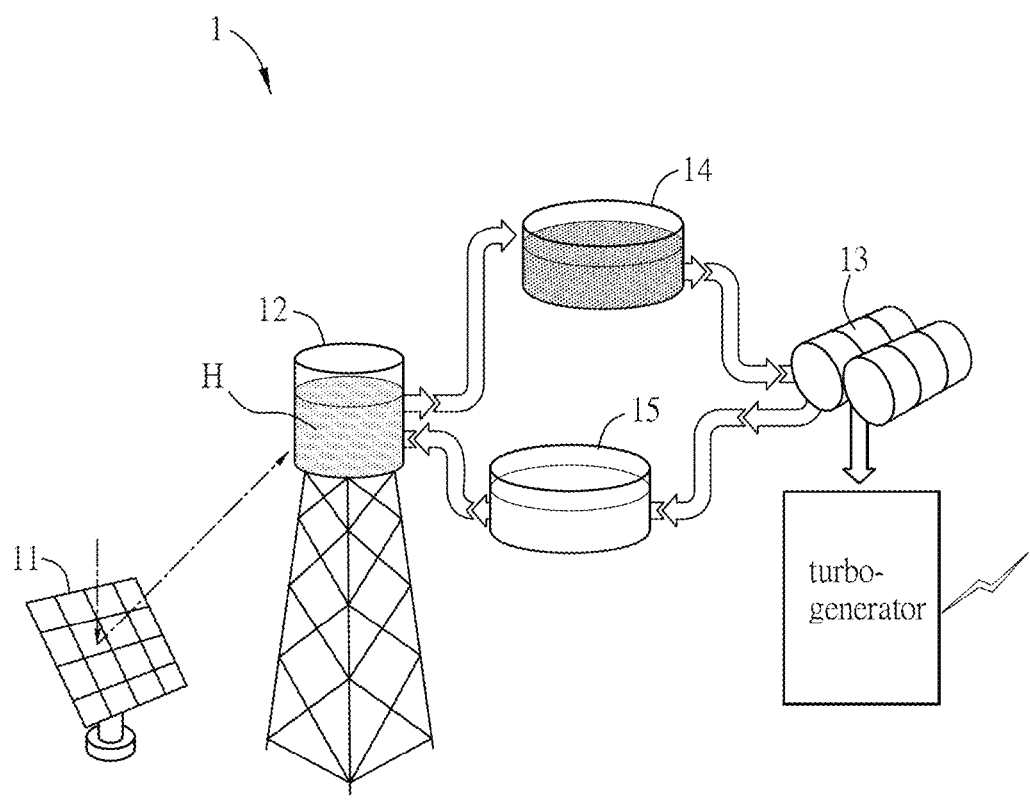
FIG. 2 is a schematic diagram of a solar thermal system.

FIG. 2 is a schematic diagram of a solar thermal system 1. Herein, the operating principle of the solar thermal system 1 will be first and the working fluid of the invention will be second illustrated.

The solar thermal system 1 includes a light reflecting apparatus 11, a receiving apparatus 12 and a heat exchanging apparatus 13. The solar thermal system 1 further includes two storing apparatuses 14, 15. The heat conduction medium H can cyclically flows through the receiving apparatus 12, the storing apparatuses 14 and 15, and the heat exchanging apparatus 13. The light reflecting apparatus 11 can include a solar tracking system and reflect the sunlight to the receiving apparatus 12 for heating the heat conduction medium H within the receiving apparatus 12. The heated heat conduction medium H is stored by the storing apparatus 14 and then transferred to the heat exchanging apparatus 13 that can transfer heat of the heat conduction medium H to the water that heating the water to steam. The steam can propel the turbo-generator to generate the required electric power. Meanwhile, the cooled heat conduction medium H after the heat exchange is transferred to the storing apparatus 15 and then the receiving apparatus 12, thus a complete cycle is operated. Accordingly, the heat conduction medium H is used to store the heat of the sunlight, and the power is generated by the heat exchange and the turbo-generator. Although the heat conduction medium H in the solar thermal system 1 is used to store heat by its sensible heat, the fact is that the latent heat of the substance is larger than the sensible heat. So, if the latent heat can be used to store heat, the heat storing capability of the solar thermal system 1 can be apparently greater than that of just using the sensible heat. Theoretically speaking, the said metal nano-particles are added into the heat conduction medium H in this invention to enhance the total heat capacity of the solar thermal system 1. That is, the latent heat of the metal nano-particles is used to increase the heat storing capability of the solar thermal system 1, which expanded the application of the solar thermal system 1.

The working fluid of the invention is in cooperation with the solar thermal system 1. The working fluid is a phase-change fluid-like heat transfer materials and can be reused several times within the loop of the solar thermal system 1. In the invention, a plurality of metal nano-particles are added into the heat conduction medium H to form a working fluid of the solar thermal system 1. The weight percent of the metal nano-particles added to the heat conduction medium H can range between 1% and 20%. Accordingly, the metal nano-particles are mixed in the heat conduction medium H to increase the heat capacity thereof and can be reused. Each the metal nano-particle includes a metal particle and a protection layer. The protection layer is an oxide and encloses the metal particle. Since the manufacturing method and other features of the metal nano-particles are clearly illustrated in the above embodiments, they are not described here for conciseness.

The heat conduction medium H of the solar thermal system 1 can be a homogeneous fluid with a stable heat capacity within a certain temperature range (e.g. 100° C.~500° C. or more), and the material thereof could be inorganic salt or organic polymer. The said inorganic salt can be molten salt formed by several inorganic compound mixed together, nitrate, phosphate, or halide, for example. The said nitrate includes $NaNO_3$, $KNO_3$ or $NaNO_2$ for example. The heat conduction medium H of this embodiment is eutectic salt (called Hitec molten salt hereinafter) as an example, composed of 7% sodium nitrate, 53% potassium nitrate and 40% sodium nitrite. Otherwise, the heat conduction medium H can have other compositions and weight percents.

Then, other technical features of the metal nano-particles and working fluid will be illustrated as below by referring to the related figures.

Figure 3A:
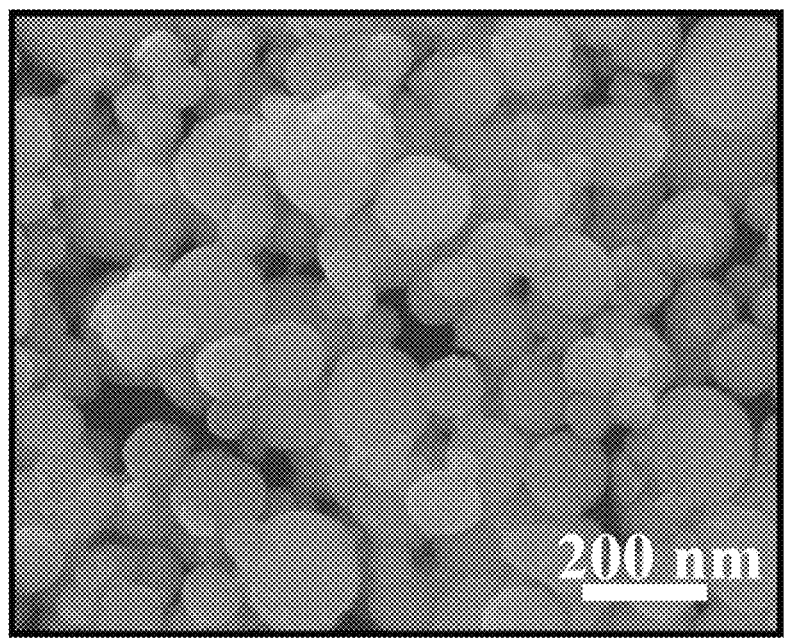
FIG. 3A is an SEM micrograph of the metal particles according to the invention.
Figure 3B:
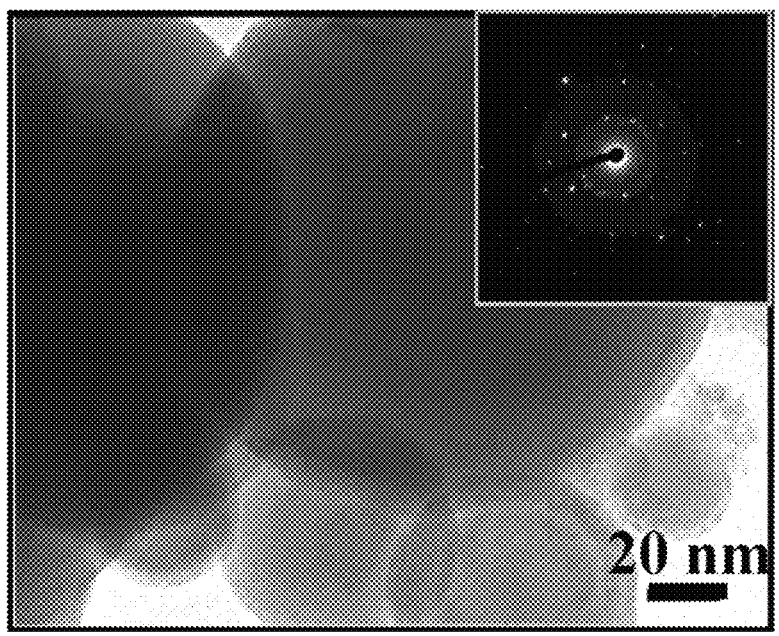
FIG. 3B is a TEM micrograph of the metal particles in FIG. 3A.
Figure 3C:
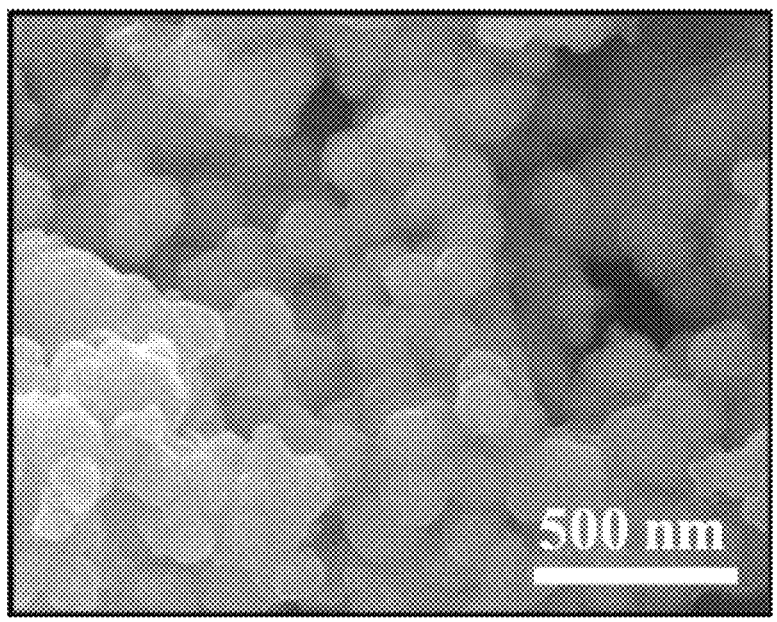
FIG. 3C is an SEM micrograph of the metal nano-particles according to the invention.
Figure 3D:
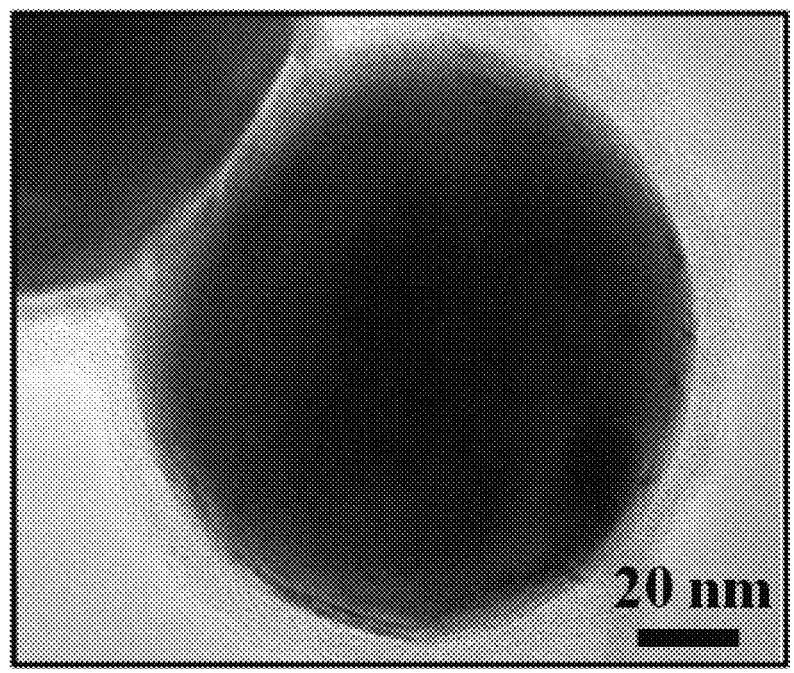
FIG. 3D is a TEM micrograph of the metal nano-particles in FIG. 3C.

FIG. 3A is an SEM micrograph of the metal particles (tin nano-particles) according to the invention, FIG. 3B is a TEM micrograph of the metal particles in FIG. 3A, FIG. 3C is an SEM micrograph of the metal nano-particles according to the invention, and FIG. 3D is a TEM micrograph of the metal nano-particles in FIG. 3C.

It can be seen from the TEM micrograph of FIG. 3B that the tin nano-particle is a poly-crystalline type. Besides, it can be seen from FIGS. 3C and 3D that the protection layer ($SiO_x$) certainly encloses the tin nano-particle of the metal nano-particle made by the manufacturing method of the metal nano-particles of the invention, where the diameter of the metal nano-particle is about 100 nm and the thickness of the protection layer is about 5~10 nm.

Figure 4A:
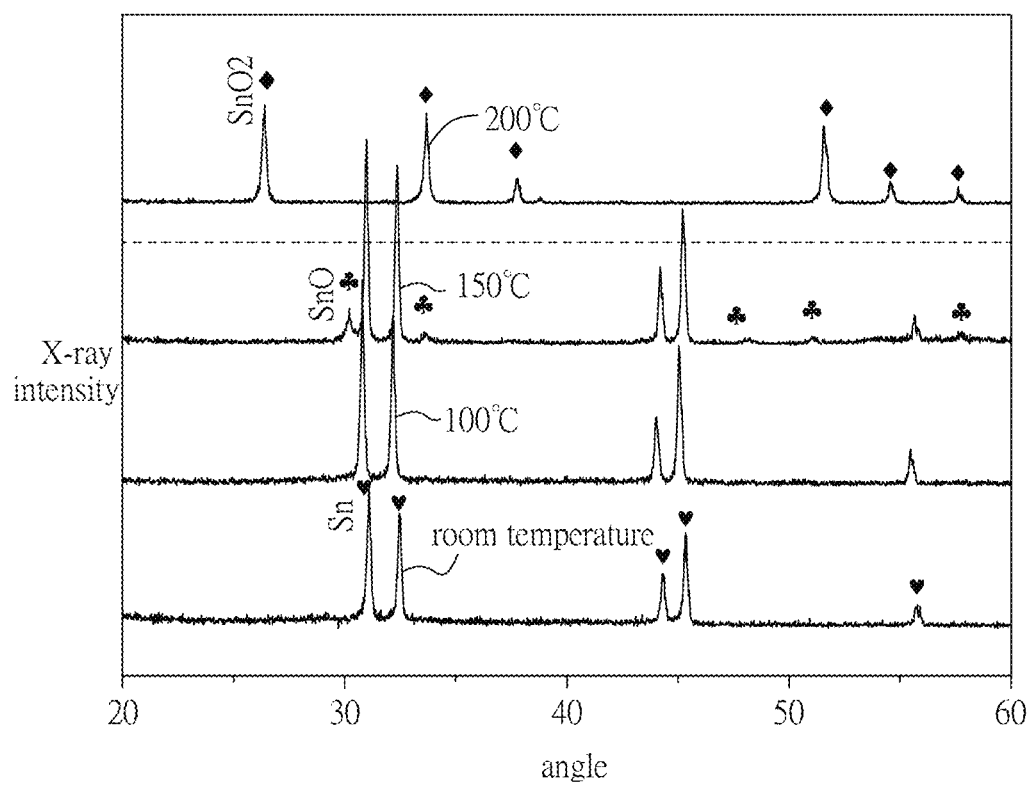
FIG. 4A is a schematic diagram showing the X-ray diffraction of the tin nano-particles experiencing the heat treatment of different annealing temperatures.

FIG. 4A is a schematic diagram showing the X-ray diffraction of the tin nano-particles experiencing the heat treatment of different annealing temperatures.

In FIG. 4A, after the heat treatment of 200° C., the pure tin nano-particle almost becomes a complete crystalline phase of tin oxide. That is, the spectrum of the said particle is totally different from that of the room-temperature tin nano-particle and that of the metal nano-particles made by the annealing temperatures of 100° C. and 150° C. respectively. It indicates that the heat treatment apparently influences the metal content of the pure tin nano-particles.

Figure 4B:
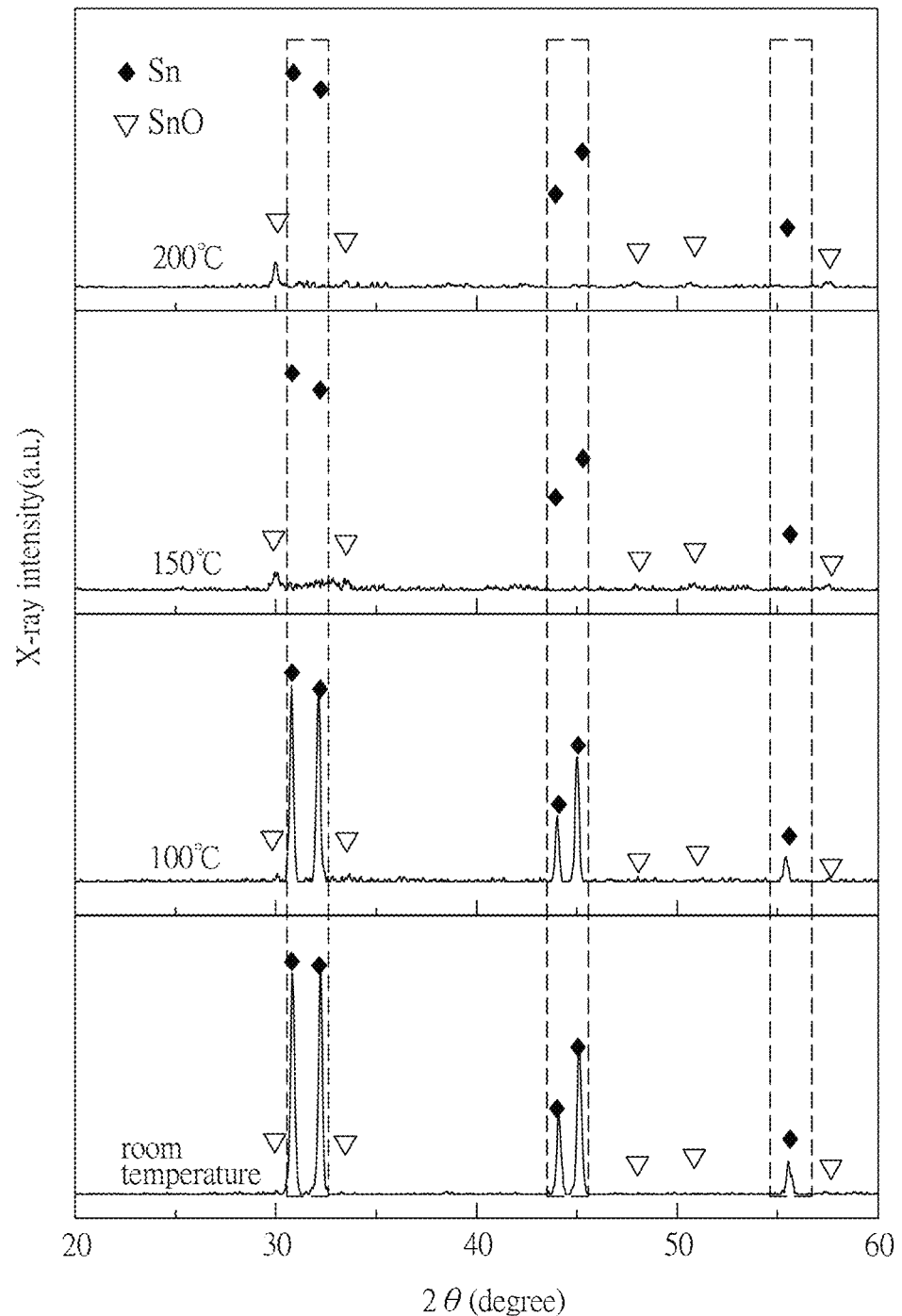
FIGS. 4B and 4C are schematic diagrams showing the real-time X-ray diffraction of the metal nano-particles of the invention.
Figure 4C:
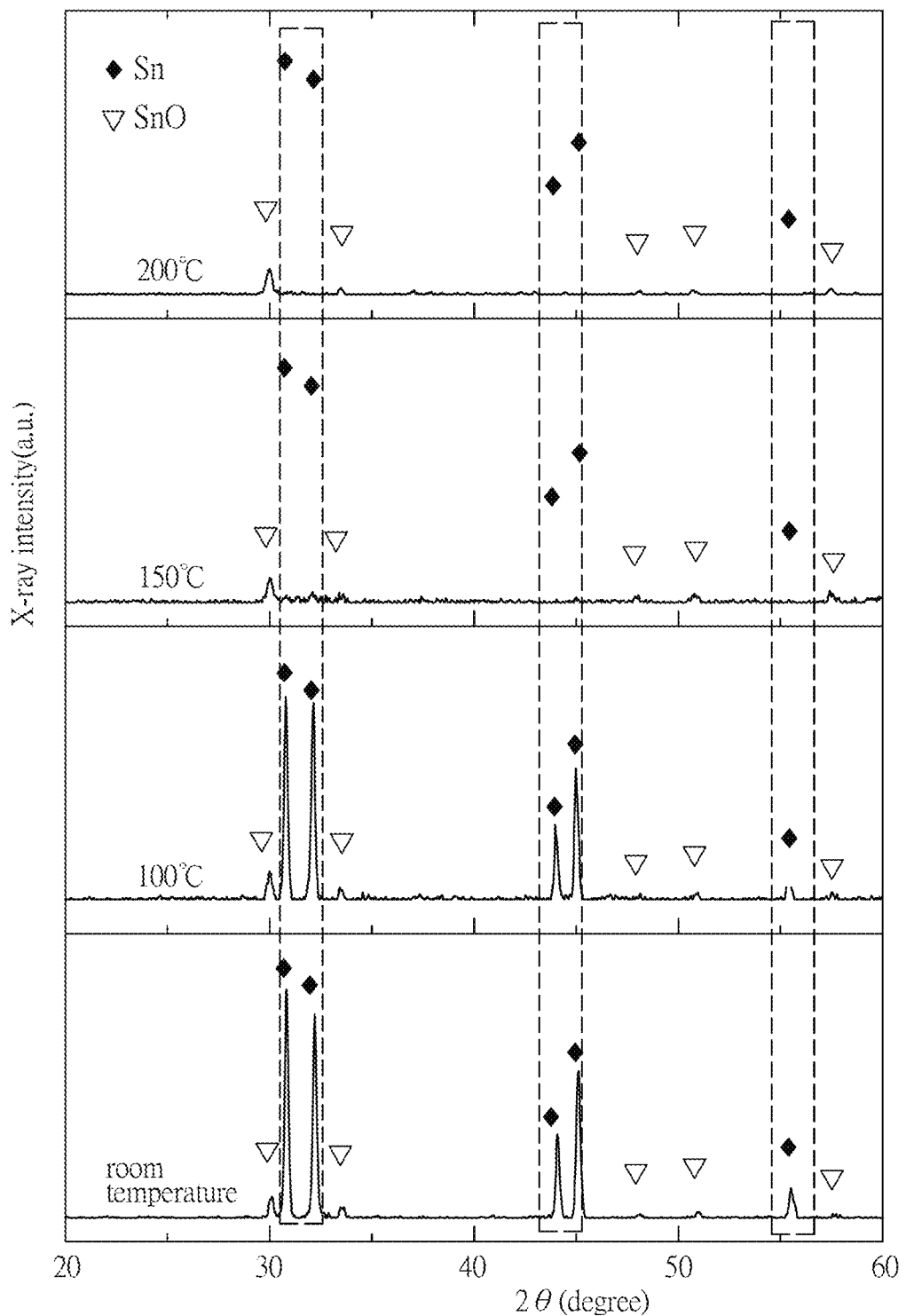

FIGS. 4B and 4C are schematic diagrams showing the real-time X-ray diffraction of the metal nano-particles of the invention. FIG. 4B is the X-ray diffraction diagram from the room temperature up to 200° C., and FIG. 4C is the X-ray diffraction diagram from 200° C. down to the room temperature. Moreover, the solid rhombus in the figure denotes the signal of Sn while the hollow inverted triangle denotes the signal of SnO.

It can be seen from FIG. 4B that the signal of Sn weakens more with the temperature climbing more, and there is no signal of Sn, meaning the tin has been completely molten, at 150° C. or more. Besides, seen from FIG. 4C, the signal of Sn strengthens more when the temperature is decreased from 200° C. to the room temperature, and the signal of Sn appears again at 100° C. or less, meaning the tin has been solidified at 100° C. or less. From the above results, it can be proofed that the Sn—$SiO_x$ nano-particles have been successfully synthesized in the invention and the $SiO_x$ protection layer successfully protects the molten tin.

Figure 5A:
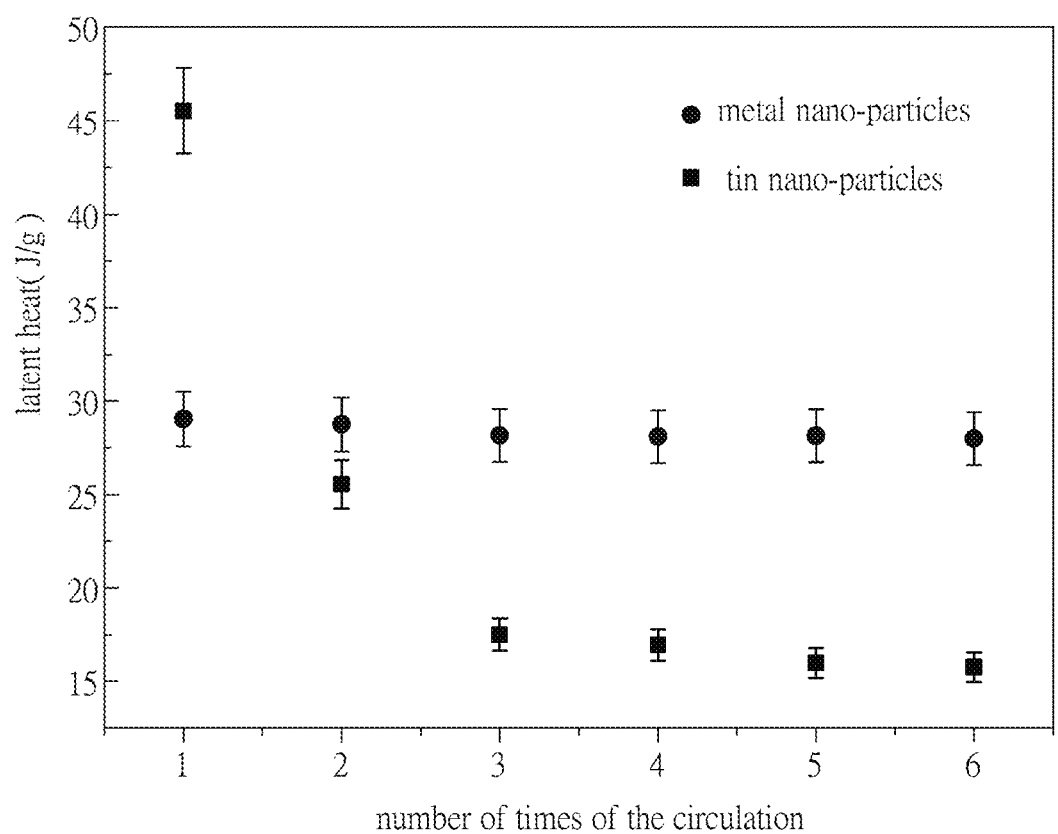
FIG. 5A is a schematic diagram showing the change of the latent heat of the metal nano-particles and tin nano-particles with different number of times of the circulation.
Figure 5B:
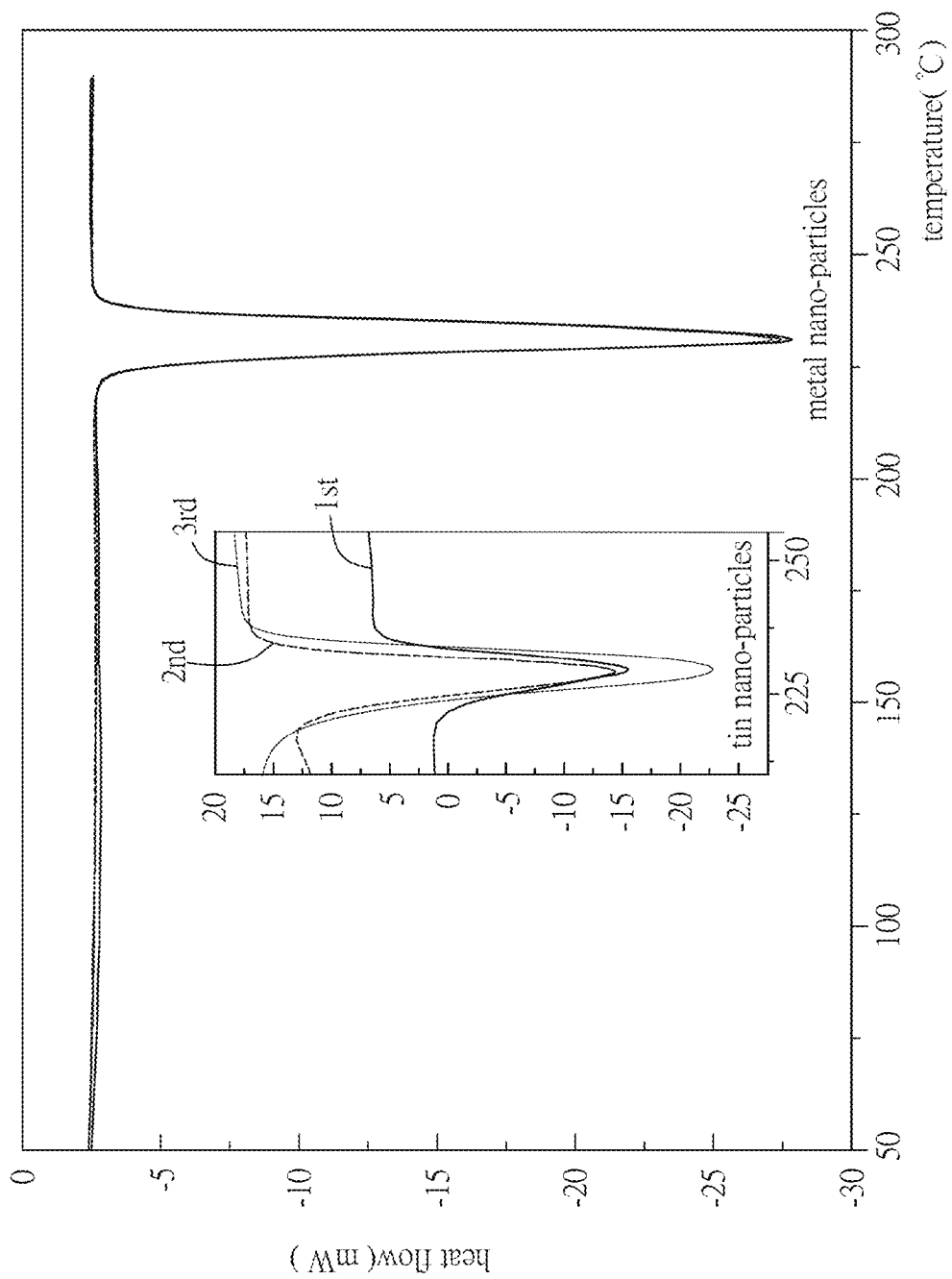
FIG. 5B is a schematic diagram showing the change of the heat flow of the metal nano-particles and tin nano-particles with different number of times of the circulation.

FIG. 5A is a schematic diagram showing the change of the latent heat of the metal nano-particles and tin nano-particles with different number of times of the circulation, and FIG. 5B is a schematic diagram showing the change of the heat flow of the metal nano-particles and tin nano-particles with different number of times of the circulation.

It can be found in FIG. 5A that the latent heat of the metal nano-particles is still very stable (about 28.16 J/g) after several times of the circulation. However, when the tin nano-particles without the protection layer are joined, the latent heat fluctuates a lot and seems unstable with different number of times of the circulation. Besides, it can be found in FIG. 5B that the curves of the heat flow of the metal nano-particles with different number of times of the circulation still overlap and seem relatively stable whereas the heat flow of the tin nano-particles seems unstable and fluctuates a lot. Therefore, in the invention, the metal nano-particles still can keep the features and properties thereof very stable even though they are used several times. Accordingly, the metal nano-particles of the invention are favorably suitable to be added into the heat conduction medium H of the solar thermal system 1 to form the working fluid thereof.

Figure 6A:
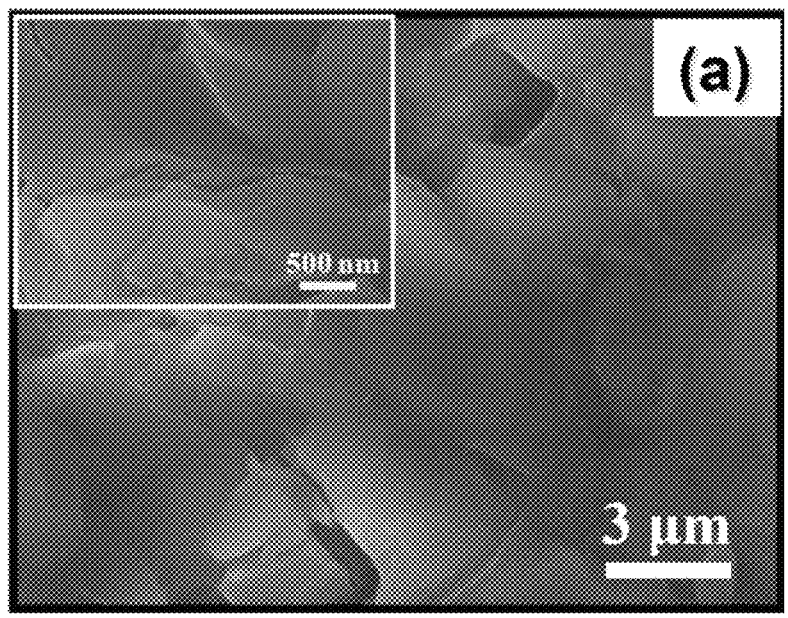
FIG. 6A is an SEM micrograph of the Hitec molten salt.
Figure 6B:
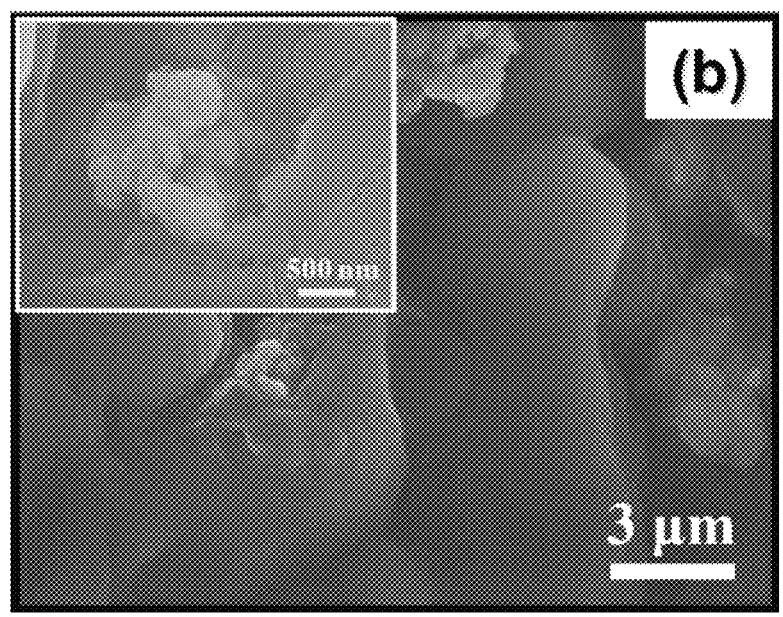
FIG. 6B is an SEM micrograph of the Hitec molten salt with the metal nano-particles therein.

FIG. 6A is an SEM micrograph of the Hitec molten salt, and FIG. 6B is an SEM micrograph of the Hitec molten salt with the metal nano-particles therein. The enlarged diagram at the upper left corner of FIG. 6B shows that the metal nano-particles are distributed in the Hitec molten salt.

Figure 6C:
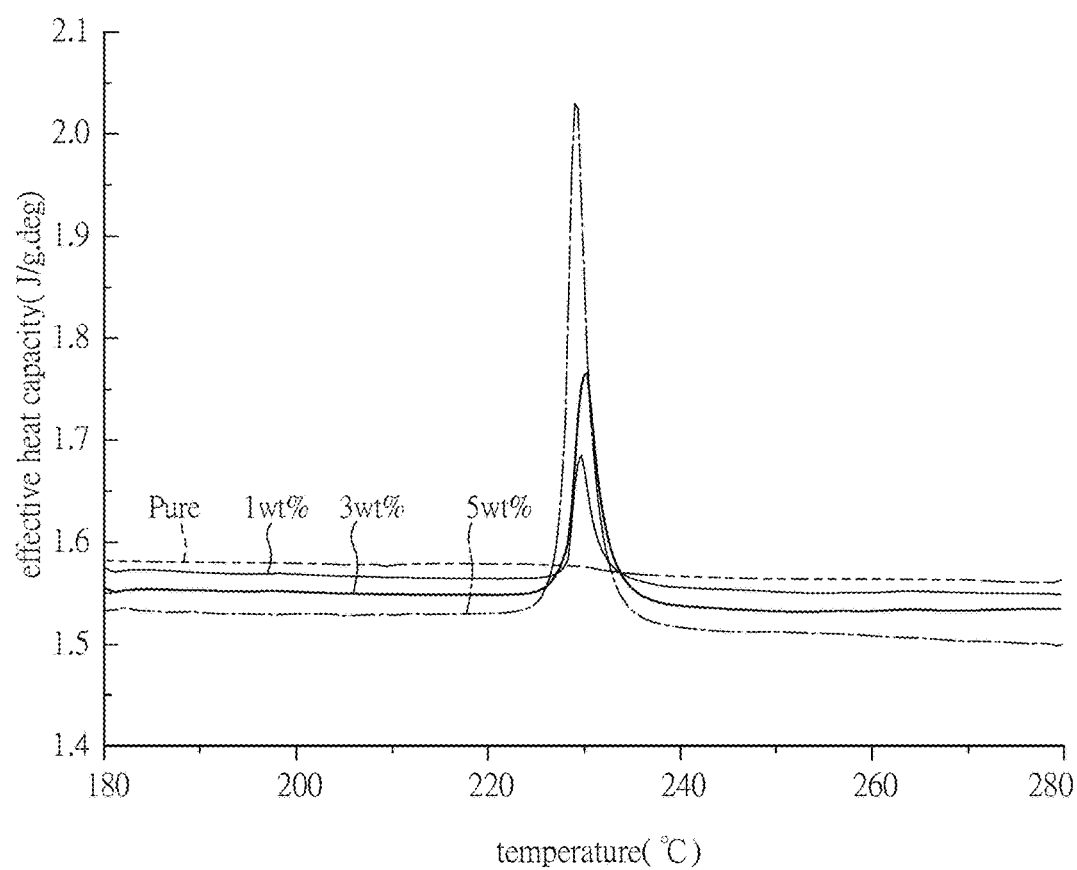
FIG. 6C is a schematic diagram showing the effective heat capacities of the Hitec molten salt including 1 wt %, 3 wt % and 5 wt % metal nano-particles respectively.
Figure 6D:
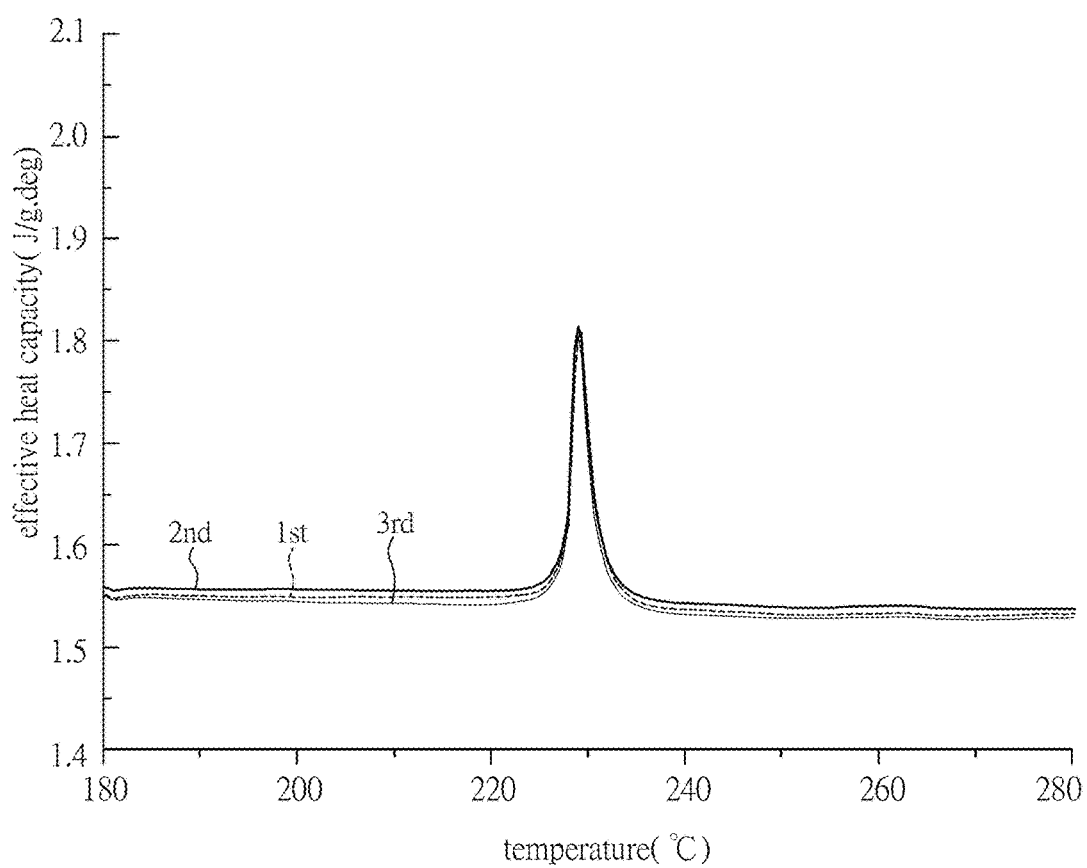
FIGS. 6D and 6E are schematic diagrams respectively showing the changes of the heat capacity of the Hitec molten salt including 3 wt % and 5 wt % metal nano-particles with different number of times of the circulation.
Figure 6E:
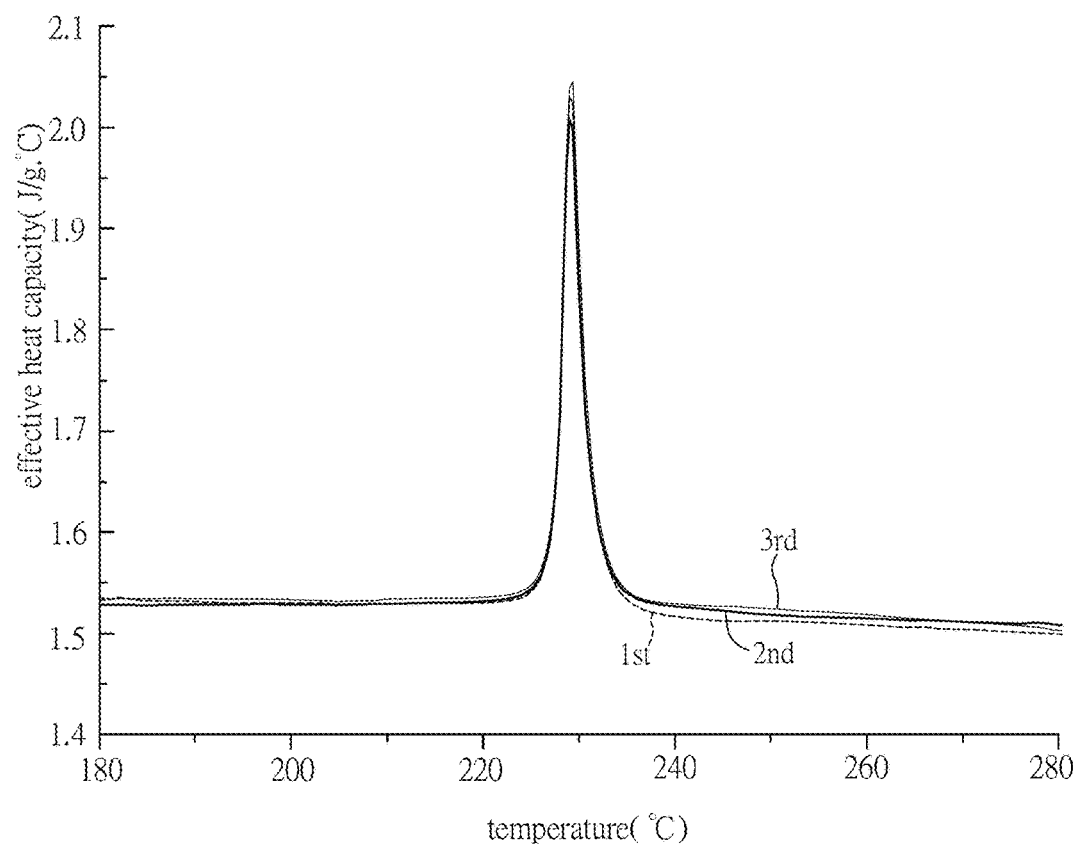

FIG. 6C is a schematic diagram showing the effective heat capacities of the Hitec molten salt including 1 wt %, 3 wt % and 5 wt % metal nano-particles respectively, and FIGS. 6D and 6E are schematic diagrams respectively showing the changes of the heat capacity of the Hitec molten salt including 3 wt % and 5 wt % metal nano-particles with different number of times of the circulation.

As shown in FIG. 6C, even though the metal nano-particles of different weight percents are individually added to the Hitec molten salt, the effective heat capacities of the working fluids all sharply ascend in the vicinity of the melting point of tin (225° C.), caused by the release of the latent heat of the metal nano-particles in the working fluid. In the embodiment, it is called the temperature for the release of the latent heat. When the 1 wt % metal nano-particles are added to the Hitec molten salt, the effective heat capacity of the working fluid in the vicinity of the melting point of tin is increased by 6.4% ((1.67−1.57)/1.57*100%=6.4%). When the 3 wt % metal nano-particles are added to the Hitec molten salt, the effective heat capacity of the working fluid in the vicinity of the melting point of tin is increased by 12.7% ((1.77−1.57)/1.57*100%=12.7%). When the 5 wt % metal nano-particles are added to the Hitec molten salt, the effective heat capacity of the working fluid in the vicinity of the melting point of tin is increased by 29.3% ((2.03−1.57)/1.57*100%=29.3%).

As shown in FIGS. 6D and 6E, in the cases of the metal nano-particles of 3 wt % and 5 wt % individually added into the Hitec molten salt, the working fluids still have very stable heat capacities in the vicinity of the melting point of tin despite different number of times of the circulation. Accordingly, it is proofed again that the metal nano-particles and working fluid of the invention can have very stable effective heat capacity and thus are suitable for the application of the solar thermal system 1 with the circulating use.

Figure 7:
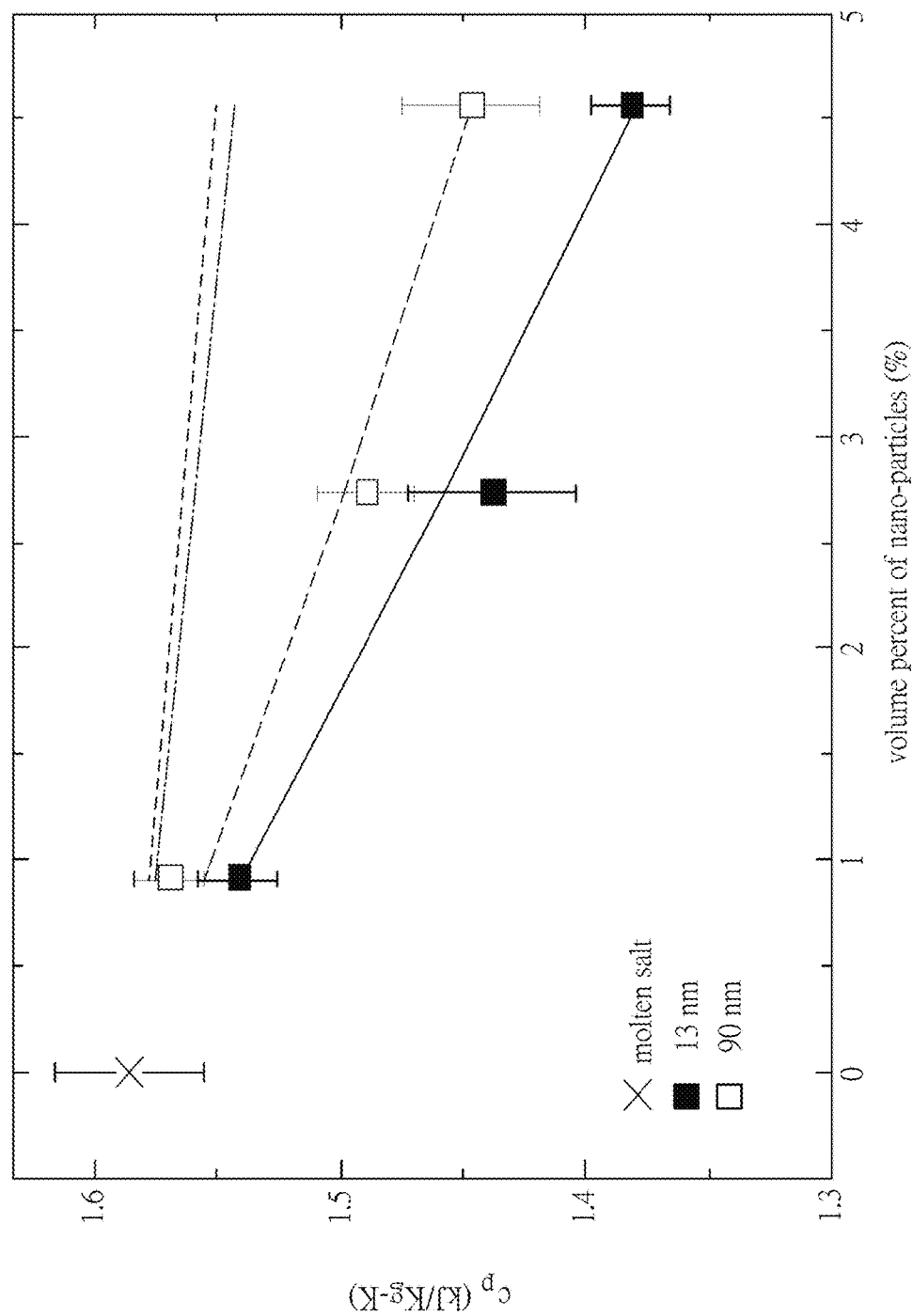
FIG. 7 is a schematic diagram showing the change of the heat capacity of the Hitec molten salt including the metal oxide nano-particles therein.

To be noted, the metal nano-particle includes a metal particle and a protection layer. The material of the protection layer includes an oxide (e.g. including metal oxide or $SiO_x$) covering the metal particle. According to the technical literatures, technical personnel added the $Al_2O_3$ nano-particles to the Hitec molten salt before. However, by referring to the technical literatures such as FIG. 7, it can be found that the heat capacity (Cp) is less when the $Al_2O_3$ nano-particles of a higher volume percent are joined, resulting in a bad effect. Therefore, the metal oxide nano-particles without the protection layer are unsuitable to be added to the Hitec molten salt of the solar thermal system 1.

Figure 8:
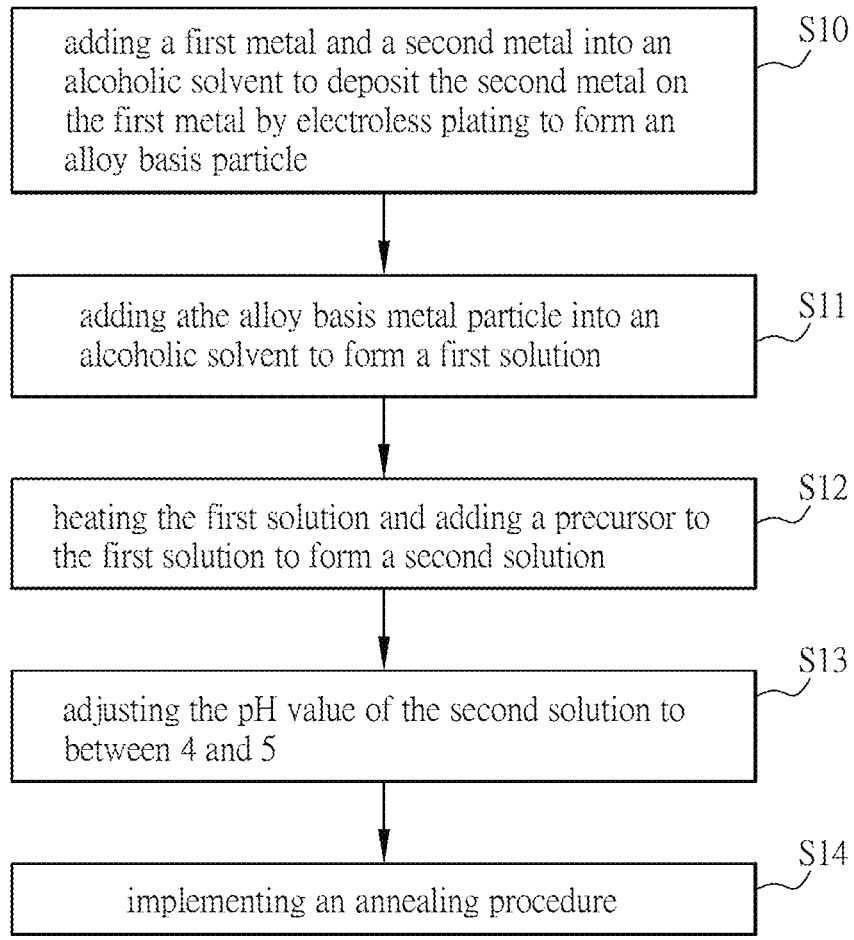
FIG. 8 is a flow chart of a manufacturing method of metal particles according to a second embodiment of the invention.

FIG. 8 is a flow chart of a manufacturing method of metal particles according to a second embodiment of the invention. Referring to FIG. 8, the manufacturing method according to the second embodiment includes the steps of: adding a first metal and a second metal into an alcoholic solvent to deposit the second metal on the first metal by electroless plating to form an alloy basis particle (step S10); adding the alloy basis particle into an alcoholic solvent to form a first solution (step S11); heating the first solution and adding a precursor to the first solution to form a second solution (step S12); adjusting the pH value of the second solution to between 4 and 5 (step S13); and implementing an annealing procedure (S14). Similar to the previous embodiment, the manufactured metal particles can be mixed in a heat conduction medium to form a working fluid.

In details, the steps S11-S14 of the second embodiment can refer to the steps S01-S04 of the first embodiment, but the difference is that the metal particle is replaced by the alloy basis particle. Thus, the manufacturing method of metal particles according to the second embodiment, namely the manufacturing method of alloy particles further includes the step S10 in comparison of the first embodiment. In the embodiment, a first metal and a second metal are added into an alcoholic solvent, and then the second metal is deposited on the first metal by electroless plating so as to form an alloy basis particle. At the moment, the second metal covers the first metal (as core). In the embodiments, the kinds of the first metal and the second metal are not particularly limited, but the first metal and the second metal are required to be eutectic and have a eutectic temperature. Thus, the first metal and the second metal can form a uniform alloy by heating at a temperature (eutectic temperature) which is lower than the melting points of each the first metal and the second metal.

In details, the first metal may be zinc (Zn) and the second metal may be tin (Sn). The Zn particles and the Sn particles are added into an alcoholic solvent which is ethanol for example in the embodiment. Then, the second metal is deposited on the first metal by electroless plating so as to form a Sn—Zn alloy basis particle. At the moment, the Sn covers the Zn particle (as core) in the Sn—Zn particle. Moreover, by controlling the duration of the reaction of the electroless plating, the deposition of the second metal on the first metal is adjustable and determinable so that the alloy basis particle has an expected ratio of the first metal to the second metal. For example, the expected ratio may be a ratio of the weight percent of the first metal and the second metal. Preferable, it can be ranged from first and second pure metals to alloy between two metals with controllable compositions. For example, the expected ratio may be controlled and determined during manufacturing, and it may range between 4 and 0.2. Before adding the first metal and the second metal into the alcoholic solvent to deposit the second metal on the first metal to form the alloy basis particle, an adjustable controllable ratio is determined as the expected ratio. This ratio should be acceptable and possible for the first and second metals to form the alloy. As shown in Table 1, it shows the expected ratio of the alloy basis particle processed by the electroless plating with different reaction durations.

TABLE 1

| | Reaction duration of electroless plating (minutes) | Zn (first metal) Wt. % ± err | Sn (second metal) Wt. % ± err | Expected ratio |
|---|---|---|---|---|
| A | None | 100 ± 0.5 | 0 ± 0.5 | — |
| B | 3.75 | 79.7 ± 7.1 | 20.3 ± 1.8 | 3.9 |
| C | 15 | 62.0 ± 4.5 | 38.0 ± 2.8 | 1.63 |
| D | 60 | 34.8 ± 2.5 | 65.2 ± 4.7 | 0.53 |

Here, the sample A in Table 1 is a metal particle of single metal (Zn) and acts as the control group of experiments. The samples B-D are Sn—Zn alloy basis particles, regarding the sample B, the reaction duration of electroless plating is controlled at about 3.75 minutes to form the Sn—Zn alloy basis particle with the expected ratio of 3.9; regarding the sample C, the reaction duration of electroless plating is controlled at about 15 minutes to form the Sn—Zn alloy basis particle with the expected ratio of 1.63; regarding the sample D, the reaction duration of electroless plating is controlled at about 60 minutes to form the Sn—Zn alloy basis particle with the expected ratio of 0.53. Furthermore, the temperature range of latent heat absorption/releasing of the alloy particles is adjustable by adjusting the expected ratio which is descripted later.

After step S10, the Sn is deposited on the outer surface of Zn particle by electroless plating to form the Sn—Zn alloy basis particle. Then, the ethanol solution containing the Sn—Zn alloy basis particles is centrifuged (3000 rpm, 10 minutes), the supernatant is removed and the pellet can be obtained namely the Sn—Zn alloy basis particles. Then in step S11, the Sn—Zn alloy basis particles are added into an alcoholic solvent. For example, the pellet (Sn—Zn alloy basis particle) is directly added into another ethanol (alcoholic solvent) and dissolved to form the first solution of step S11. Preferably, the concentration of the first solution is about 0.5M.

Then, steps S12-S14 are performed to form the metal particles including the alloy basis particles of the embodiment. The details of steps S12-S14 can refer to steps S02-S04 of the first embodiment. In other words, the step S12 is performed to heat the first solution and add a precursor to the first solution to form a second solution. Because the precursor can refer to the step S02, it is not repeated here. Then, the step S13 is performed to adjust the pH value of the second solution to between 4 and 5. Thereby, the precursor can be uniformly attached to the Sn—Zn alloy basis particles by a sufficient stirring. It is noted that in the Sn—Zn alloy basis particles formed in the step S10 and the Sn—Zn alloy basis particles formed in the steps S11-S13, the Sn cover the Zn (as core).

The step S14 is performed to implement an annealing procedure. In the embodiment, the annealing procedure has two stages. The first stage can refer to the step S04, the annealing temperature may range between 200° C. and 300° C., and the annealing duration may range between one hour and two hours, and thus a protection layer which covers the alloy basis particle is formed on the surface of the second metal of the alloy basis particle. In the embodiment, the material of the protection layer is oxide. For example, it is the protection layer of silicon oxide ($SiO_x$) formed on the surface of the second metal (Sn) in the annealing procedure. In the second stage of the annealing procedure, the annealing temperature may range between 450° C. and 550° C., and the annealing duration may range between 10 minutes and 15 minutes. By the second stage of the annealing procedure, Sn and Zn of the alloy basis particle are recrystallized. As a result, the alloy basis particle is changed from Sn covering Zn (as core) into a eutectic of Sn and Zn and accordingly becomes an alloy particle. Thus, the metal particle in which the protection layer covers the alloy particle in the embodiment is obtained. Moreover, in the embodiment, the melting point of the protection layer is much higher than the melting points of the first metal (Zn) and the second metal (Sn), and the protection layer completely seals the alloy particle (the eutectic mixture of the first metal and the second metal). For example, the melting point of silicon oxide (protection layer) is about 1,600° C., the melting point of the first metal (Zn) is about 420° C., the melting point of the second metal (Sn) is about 232° C., and the melting point of the protection layer is much higher than the melting points of the first metal (Zn) and the second metal (Sn). Thus in the second stage of the annealing procedure, the first metal (Zn) and the second metal (Sn) is packaged in the protection layer to form eutectic, and the melted metals are protected from flowing out.

Similarly, in the embodiment, a plurality of manufactured metal particles can be mixed in a heat conduction medium to form a working fluid. It can be applied to the solar thermal system as descripted above or other heat storing materials. In the embodiment, the temperature range of latent heat absorption/releasing of the alloy particles is dependent on an expected ratio of the first metal to the second metal, and the detail is described with FIG. 9 later.

Figure 9:
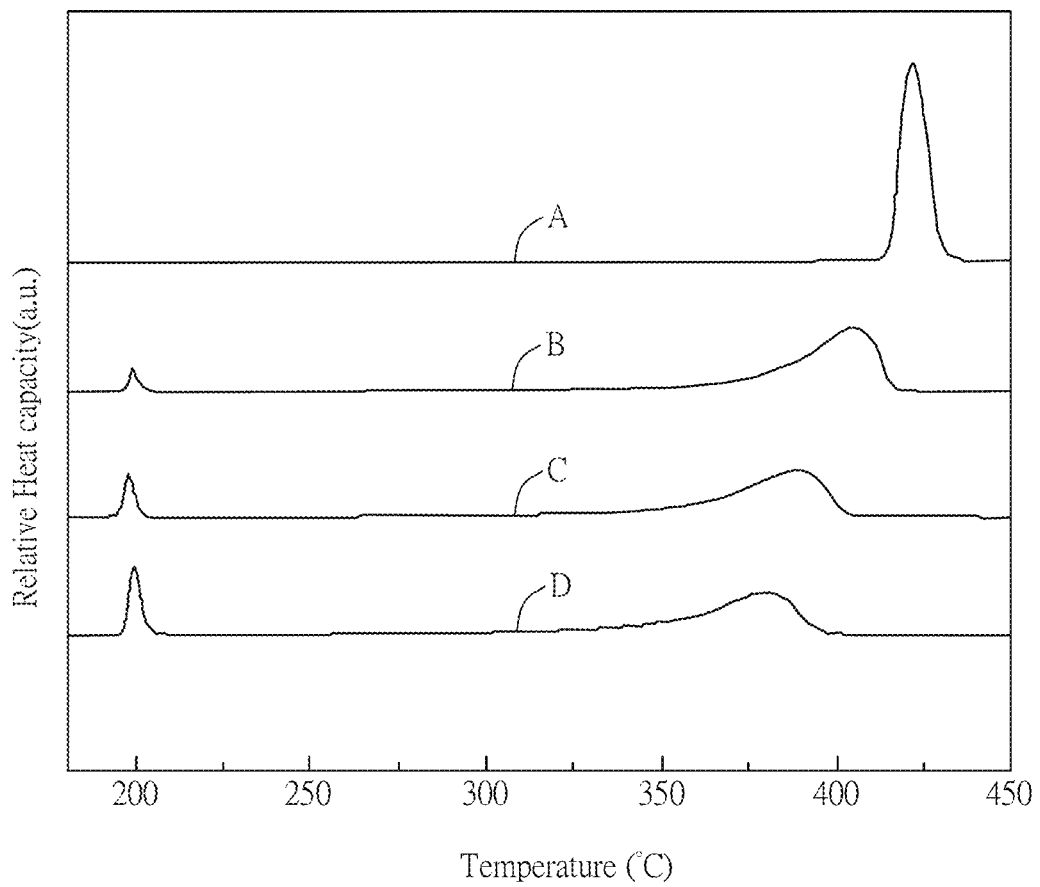
FIG. 9 is a comparison diagram showing the relative heat capacity of Hitec molten salts which the metal particles formed of the first metal and the second metal with distinct ratios are added into.

FIG. 9 is a comparison diagram showing the relative heat capacity of Hitec molten salts which the metal particles formed of the first metal and the second metal with distinct ratios are added into. The metal particles contained in the working fluids A-D shown in FIG. 9 can refer to Table 1. Referring to FIG. 9 and Table 1, if the material of the metal particle is a single metal (Zn), the effective heat capacity of the working fluid A at 420° C. to 430° C. rises up because the latent heat functions (release), namely the temperature range of latent heat releasing/absorption of the working fluid A ranges between 420° C. and 430° C. (the temperature range is 10° C.). If the material of the metal particle is an alloy (Sn—Zn) and the expected ratio is 3.9, namely the temperature range of latent heat releasing/absorption of the working fluid B ranges between 375° C. and 410° C. (the temperature range is 35° C.), the effective heat capacity of the working fluid B at 375° C. to 410° C. rises up because the latent heat functions (release). If the material of the metal particle is an alloy (Sn—Zn) and the expected ratio is 1.63, namely the temperature range of latent heat releasing/absorption of the working fluid C ranges between 360° C. and 405° C. (the temperature range is 45° C.), the effective heat capacity of the working fluid C at 360° C. to 405° C. rises up because the latent heat functions (release). If the material of the metal particle is an alloy (Sn—Zn) and the expected ratio is 0.53, namely the temperature range of latent heat releasing/absorption of the working fluid D ranges between 350° C. and 395° C. (the temperature range is 45° C.), the effective heat capacity of the working fluid D at 350° C. to 395° C. rises up because the latent heat functions (release).

As mentioned above, by adjusting the expected ratio of the first metal to the second metal, the temperature range of latent heat releasing/absorption of the working fluid accordingly changes in different ranges. In other words, the temperature range of latent heat releasing/absorption is dependent on the expected ratio of the first metal to the second metal. Moreover, from FIG. 9, the temperature range of latent heat releasing/absorption of the working fluid B-D are wider than that of the working fluid A. In other words, regarding the particles in the working fluids, the working fluid which contains alloy material (for example Sn—Zn alloy) has a wider temperature range of latent heat releasing/absorption than that for the working fluid merely containing particles of single metal (Zn) does.

In summary, the manufacturing method of the metal particles includes the steps of: depositing a second metal on a first metal to form an alloy basis particle by electroless plating; adding the alloy basis particle to an alcoholic solvent to form a first solution; heating the first solution and adding a precursor to the first solution to form a second solution; adjusting the pH value of the second solution to between 4 and 5; and implementing an annealing procedure to form a protection layer on the surface of the alloy basis particle, wherein the protection layer can be an oxide covering the alloy basis particle and the alloy basis particle becomes an alloy particle. Thereby, the manufacturing method of metal particles of the invention can have several advantages such as simplified processes, lower cost and multiple applications. Since the metal nano-particles of the invention are highly able to convey heat and store heat and will not be a flow resistance, they are suitable to be added to the heat conduction medium of a solar thermal system for increasing the effective heat capacity of the working fluid. Moreover, the alloy particle includes the first metal and the second metal, the alloy particle has an expected ratio of the first metal to the second metal, and the effective heat capacity of the working fluid or the temperature range of latent absorption/releasing of the working fluid is dependent on an expected ratio of the first metal to the second metal. Therefore, the metal particles according to the invention can be widely applied to other energy storing materials.

Besides, the working fluid including the metal particles of the invention can be applied to the solar thermal system or energy storing materials. The working fluid includes a heat conduction medium and a plurality of metal nano-particles mixed in the heat conduction medium. Each of the metal particles includes an alloy particle and a protection layer, which can be an oxide and covers the metal particle. The alloy particle includes the first metal and the second metal, the alloy particle has an expected ratio of the first metal to the second metal, and the working temperature corresponding to the latent heat of the working fluid is dependent on an expected ratio of the first metal to the second metal. Thereby, the working fluid of the invention can have a higher effective heat capacity and adjust or control the temperature range of latent heat absorption/releasing of the working fluid. It can be applied to increase the heat storing capability of the solar thermal system and energy-saving material and expand the application thereof.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A manufacturing method of metal particles for a working fluid, comprising steps of:
   depositing a second metal on a first metal to form an alloy basis particle by electroless plating;
   adding the alloy basis particle into an alcoholic solvent to form a first solution;
   heating the first solution and adding a precursor which can be attached to the alloy basis particle to the first solution to form a second solution;
   adjusting the pH value of the second solution to between 4 and 5; and
   annealing to form a protection layer on the surface of the alloy basis particle, wherein the protection layer covers the alloy basis particle to form a metal particle.

2. The manufacturing method as recited in claim 1, wherein the temperature range of latent heat absorption/releasing of the working fluid is dependent on a ratio of the first metal to the second metal.

3. The manufacturing method as recited in claim 1, wherein the melting point of the protection layer is higher than the melting points of the first metal and the second metal.

4. The manufacturing method as recited in claim 1, wherein the protection layer comprises oxide.

5. The manufacturing method as recited in claim 4, wherein the oxide comprises metal oxide or silicon oxide.

6. The manufacturing method as recited in claim 1, wherein the first metal is Zn and the second metal is Sn.

7. The manufacturing method as recited in claim 1, wherein the precursor includes 3-aminopropyl trimethoxysilane (APTMS), γ-glycidoxypropyltrimethoxysilane (GPTMS), or tetraethyl orthosilicate (TEOS).

8. The manufacturing method as recited in claim 1, wherein the annealing temperature of the annealing procedure ranges between 200° C. and 300° C., and the annealing duration ranges between one hour and two hours.

9. The manufacturing method as recited in claim 1, further comprising:
   determining an expected ratio of the first metal to the second metal for the temperature range of latent heat absorption/releasing of the working fluid before depositing,
   wherein the second metal is deposited on the first metal to form the alloy basis particle by electroless plating until the ratio of the first metal to the second metal is equal to the expected ratio.

* * * * *